United States Patent [19]

Bowden

[11] 4,204,876

[45] May 27, 1980

[54] CEMENT COLORING COMPOSITION AND METHOD OF PRODUCING SAME

[75] Inventor: Alan P. Bowden, Binfield, England

[73] Assignee: M. Hamburger & Sons, Inc., King of Prussia, Pa.

[21] Appl. No.: 925,048

[22] Filed: Jul. 17, 1978

[51] Int. Cl.$^2$ .................. C04B 7/10; C04B 31/28
[52] U.S. Cl. ............................ 106/90; 106/97; 106/288 B; 106/308 C; 106/308 S; 106/309; 106/314
[58] Field of Search ............ 106/90, 97, 101, 288 B, 106/308 C, 308 S, 314

[56] References Cited

U.S. PATENT DOCUMENTS

| | | | |
|---|---|---|---|
| 1,843,420 | 2/1932 | Gunther et al. | 106/308 S |
| 2,006,720 | 7/1935 | Rogers | 106/308 S |
| 2,442,972 | 6/1948 | Edelstein | 106/308 N |
| 2,635,057 | 4/1953 | Jordan | 106/308 N |
| 2,637,711 | 5/1953 | Auer | 106/308 S |
| 3,117,882 | 1/1964 | Herschler | 106/97 |
| 3,663,284 | 5/1972 | Stancloft | 106/308 C |
| 3,759,729 | 9/1973 | Fohn | 106/97 |
| 4,062,694 | 12/1977 | Sawyer | 106/288 B |
| 4,131,480 | 12/1978 | McCurrich | 106/97 |
| 4,137,092 | 1/1979 | Cumpston | 106/288 B |

Primary Examiner—Brian E. Hearn
Attorney, Agent, or Firm—Nelson E. Kimmelman

[57] ABSTRACT

Thixotropic compositions for coloring cement or concrete or similar products comprise particulate pigment particles (about 20–80% by weight), at least one stabilizer (about 0.4–15%), a dispersent (about 0.1–3.0%) and water (about 12–77%). Methods of making these compositions are also explained.

29 Claims, 2 Drawing Figures

CEMENT COLORING COMPOSITION AND METHOD OF PRODUCING SAME

BACKGROUND OF THE INVENTION

1. FIELD OF THE INVENTION

This invention relates to formulations and methods for preparing such formulations for coloring materials for cement and concrete products. In particular, it relates to such formulations and methods for forming thixotropic stabilized suspensions of such pigment particles which resist settling out.

2. PRIOR ART

Conventional cement or concrete coloring compositions comprise powders which are added by hand or by a screw conveyor in their dry state to a wet concrete or cement mix in a mixing apparatus. It is difficult to accurately add desired amounts of such powders to the wet concrete mix and there is often waste of such coloring material. Furthermore, with powders it is difficult to obtain a sufficiently thorough mixing of the powders into the wet cement mix so as to achieve a homogeneous color throughout the mixture. Conventional methods also require the concrete or cement contractor to maintain large inventories of the coloring composition and involve certain health hazards as well.

It is highly desirable to have a system for coloring wet cement and concrete mixes by the addition of the coloring material in a liquid form to the mix.

It is also desirable to have a system in which the coloring material may be added by liquid pumps to the wet concrete mix.

It would also be highly advantageous to have a suspension of color pigment material which will not settle out within a relatively short time.

It is another object of the present invention to provide a liquid slurry or mixture of particulate color pigments for each of several colors which can easily be mixed with one another or with a wet cement mix by the user to obtain a full range of composite colors.

Still another object of the invention is to provide a system for adding pigment material to cement and concrete mixtures which can be automated to a greater extent than has heretofore been the case.

These and other objects of the present invention, which will appear to one skilled in the art upon perusal of the present specification, the drawings, and the claims herein, are attained by the use of the formulas and processes as explained hereinbelow.

SUMMARY OF THE INVENTION

A thixotropic composition principally comprising a particulate pigment, a stabilizer, a dispersant and a liquid carrier which is predominantly water.

DESCRIPTION OF THE PREFERRED EMBODIMENTS—FIG. 1

Example 1

Figure 1:
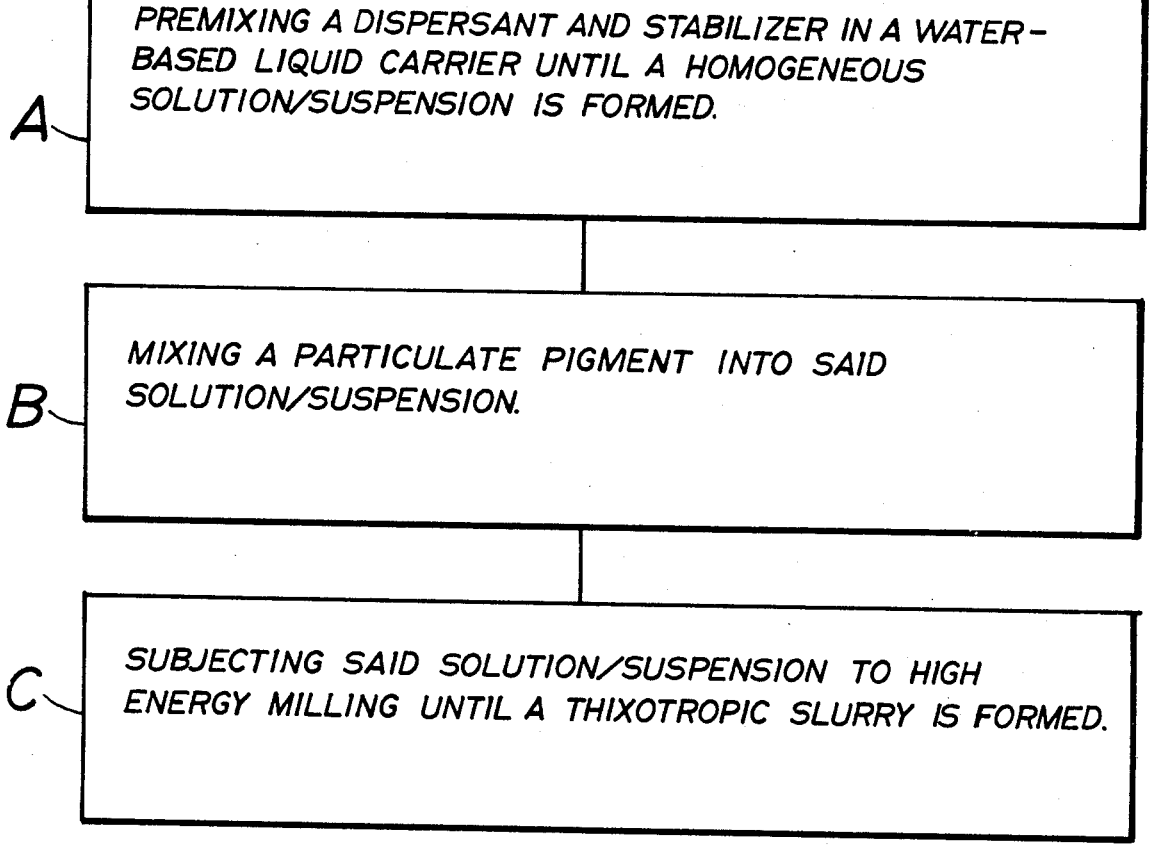
FIG. 1 is a block diagram of the principal steps of the novel method of making the novel coloring composition according to the present invention.

A mixing tank having a slow speed or low energy agitator revolving between at 80–200 rpm is partially filled with 47.17% of water (by weight). A natural gum such as gum arabic in the amount of 5% by weight is then added as well as 0.66% of a dispersant such as sodium laurate, which is a sodium salt of lauric acid sulphonate. At ambient temperatures, the water, dispersant and stabilizer are premixed until all are dissolved. Then, while the mixer is still running, 47.17% by weight of a pigment such as black iron oxide is added and the entire mixture is then mixed for up to about one hour, for example, until it is uniform and homogeneous whereupon it will have a predetermined specific gravity.

Next, the material is pumped into a high speed or high energy mill such as a stone mill, for example, to reduce the particle size of the pigment component of the slurry down into the micron range. This can be checked by the use of a grinding "wedge" or other gauge. Preferably, the particle size distribution should include largest particles with a maximum dimension of about 40 microns, large particles whose average size is about 25 microns, smaller particles whose average size is in the 1–2 micron range, and smallest particles down to a minimum size of about 0.5 microns. If the particle distribution is generally higher than these ranges, the coloring strength of the slurry is adversely affected. If the sizes of the particles are generally below these ranges they may be washed out of dried concrete by normal weathering.

The procedure described above may also be applied to many other formulations such as are set forth in the following examples:

Example 2

Black Iron Oxide:47.17%
Water:47.73%
Gum Arabic:5.00%
Sodium Laurate:0.10%

Example 3

Carbon Black:20.00%
Water:76.60%
Gum Arabic:0.4%
Ethylene Oxide Condensate:3.0%

Example 4

Carbon Black:25.0%
Water:59.0%
Alginate L. V.:15.0%
Sodium Laurate:1.0%

Example 5

Spanish Red Oxide:80.0%
Water:12.69%
Gum Arabic:7.0%
Ethylene Oxide Condensate:0.4%

Example 6

Red Oxide (Natural):60.00%
Water:30.00%
Gum Arabic:9.20%
Sodium Laurate:0.80%

Example 7

Red Oxide (Synthetic):50.00%
Water:47.00%
Gum Arabic:2.80%
Sodium Laurate:0.20%

Example 8

Yellow Oxide (Synthetic): 47.00%
Water:49.5%
Gum Arabic:3.2%
Sodium Laurate:0.3%

Example 9

Yellow Oxide (Synthetic):47.00%
Water:49.5%
Sodium Alginate (Manute RS):3.2%
Sodium Laurate:0.3%

Example 10

Yellow Oxide (Synthetic):47.00%
Water:49.5%
Carboxymethyl Cellulose (CMC) High Viscosity grade:3.2%
Sodium Laurate:0.3%

Example 11

Yellow Oxide (Synthetic):47.00%
Water:49.5%
Gum Arabic: 3.4%
Triethanolamine: 0.1%

Example 12

Yellow Oxide (Synthetic):47.00%
Water:49.5%
Gum Guar:3.2%
Sodium Laurate:0.3%

Example 13

Yellow Oxide (Synthetic):47.00%
Water:49.5%
Gum Tragacanth:3.2%
Sodium Laurate:0.3%

Example 14

Yellow Oxide (Synthetic):47.00%
Water:49.5%
Locust Bean Gum:3.2%
Sodium Laurate: 0.3%

Example 15

Yellow Oxide (Synthetic): 47.00%
Water:49.5%
Dextrine:3.2%
Sodium Laurate:0.3%

Example 16

Yellow Oxide (Synthetic):47.00%
Water:49.5%
Potato Starch: 3.2%
Sodium Laurate:0.3%

Example 17

Yellow Oxide (Synthetic):47.00%
Water:49.5%
Polyvinyl Alcohol:3.2%
Sodium Laurate:0.3%

Example 18

Yellow Oxide (Synthetic):47.00%
Water:49.5%
Polyvinyl Pyrolidone:3.2%
Sodium Laurate:0.3%

While it might be possible to make a cement coloring composition without using a dispersant such as those mentioned above, preferred embodiments of the present invention do employ them as they help the slurry to keep its suspended state for long periods of time, and they allow more of the pigment to be incorporated into the slurry. They also tend to prevent flocculation of the pigment when the slurry is added to the cement mix since the latter contains free calcium ions. Less flocculation makes for more intense coloring of the cement mix. It should be noted that, while the foregoing examples and description only have mentioned water as the liquid carrier for the slurry, aqueous solutions may alternatively be used. Thus, aqueous solutions of various monohydric or polyhydric alcohols or ketones could be used instead of water alone for anti-freeze or other purposes. For example, methyl alcohol up to 15% by weight could be added to the water. Similarly aqueous solutions of acetone, glycols or glycerols could be substituted for water alone.

Figure 2:
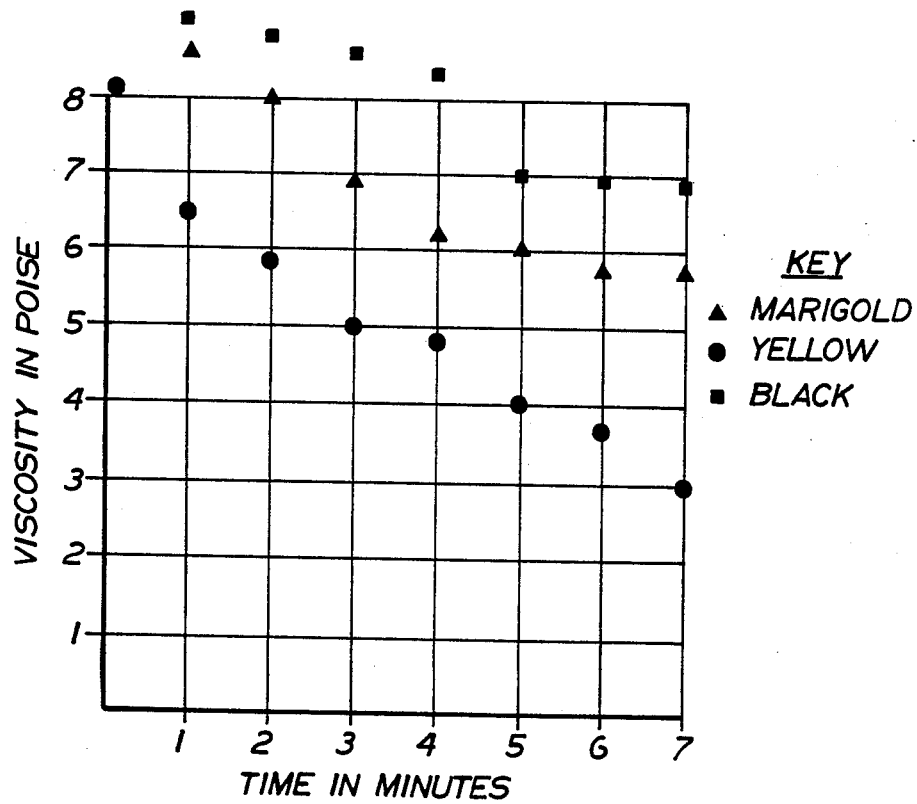
FIG. 2 is a graph illustrating preferred ranges of viscosity plotted against time for three exemplary iron oxide pigments after they have been processed into slurries by the general method shown in FIG. 1.

It is important that the viscosity of the formulation be controlled so as to insure that the formulation can be fluidized when being dispensed thereby to optimize the mixing of the formulation with the cement or concrete components. The product is therefore checked as to its viscosity which should fall substantially within the limits (measured in poise) as shown in FIG. 2. While the data shown in the graph of FIG. 2 just deals with iron oxides, the desirable viscosity ranges for other pigments will also fall within the maximum and minimum ranges shown in that drawing. The data plotted on time ordinate in FIG. 2 was determined by the use of the "Rotothinner" brand viscometer manufactured by ICI. This viscometer works by detecting mechanical shear, not by the detection of heat generation.

The color quality of the slurry may be tested by adding to it a predetermined quantity of titanium dioxide (white) in the 3:1-5:1 ratio range. This measures the relative value of the color since a given sample may require a different amount of the coloring pigment to produce the same tint as another batch of the slurry.

Other usable stabilizers include active clays such as Bentonite, Kieselgur or Benagel, uncooked corn or wheat starch, water-soluble celluloses such as hydroxy ethyl cellulose or methyl cellulose, and polyvinyl pyrolidone.

Other usable dispersants include other fatty amines and alkylamines.

Optionally, other substances may also be added to impart desired characteristics to the composition. For example, a small percentage on the order of say, 4-7% of an anti-efflorescent agent such as barium carbonate can be added. Or small percentages (say about 2%) of water-repellent chemicals such as calcium stearate, aluminum stearate or silicones can be added to the pre-mix of the dispersant and the stabilizer in water or in the aqueous carrier.

Alternative Procedures and Equipment

The premixing step may be alternatively accomplished by using a hydraulic, variable speed cavitation mixer such as those marketed by Torrance & Sons of Bristol, England or by Cowles in the United States. Present cavitation mixers are, however, somewhat limited in processing capacity.

The reduction of the particle size of the original slurry may be done by mills other than the stone mill. Alternatively, a Premier brand colloid mill manufactured by Premier Colloid Mills or other types of comminuting apparatus may be employed. Stone mills may be those manufactured by Moorhouse in the United States or by Fryma in Switzerland. Ball mills or rod mills have also been satisfactorily used, but they have the disadvantage of requiring more processing time. Attrition mills such as sand mills or pearl mills also are effective, but also usually take longer than high speed mills or colloid mills.

Slurry Dispensing System

As stated before, one of the main advantages of the present system and formulation is that thixotropic slurries of various main colors produced according to the present invention may be packaged in drums or other containers and the suspensions will not settle out for relatively long periods of time, i.e., on the order of 6-12 months. Thus, if the concrete or cement contractor wishes, he can keep perhaps 3-5 pigment slurries in individual drums, each slurry being operatively connected to a batching system which controls the amounts of said slurries to be added to the concrete mix. A charging pump may be inserted into each drum of slurry connected through a delivery tube to a metering container or tube. The tube may for example, contain a first (higher) measuring probe connected to a batching control unit whose height is adjustable (or predetermined) depending upon the amount of slurry to be measured out. Operation of the charging pump delivers the slurry to the metering tube until it touches the lower end of said first measuring probe whereupon a circuit is actuated which cuts off the pump. The charging pump for applying the slurry to the metering tube may be an air-operated positive displacement piston pump such as those marketed by Graco, Inc. of Minneapolis, Minn. Then the contents of the metering tube start to be withdrawn from the metering tube by the action of a dispensing pump (controlled by the batching unit) and to be applied (with water) to a concrete mixer of any conventional type. When the level of the metered slurry falls below the lower end of a second probe coupled to the batching unit, a signal is generated which stops the dispensing pump.

If the contents of the slurry drum have not been used for excessive lengths of time, it may be advisable to insert a recycling valve branching off from the output of the charging pump and being connected to a recycling tube which returns to the drum. The return of the slurry back to the drum will produce a certain amount of agitation of the contents of the drum.

Instead of the batching system described above, it is also possible to use a positive displacement pump of the said Graco type or of the "Mono" brand type marketed by Mono Pumps Ltd. of Great Britain. The latter pump is also marketed in the United States under the "Moyno" brand by Robbins and Meyers. The pump is set to run for a timed period so that, since the rate of flow is known, the amount of pumping time required to produce a given volume can easily be calculated. The timers may be wired to the electric motor starters of the pumps.

Still another method is to pump the slurry around a continuous circuit via a three-way valve which is air or electrically operated. The valve is connected to a timer that can switch it from continuous circuit to injection by-pass, either straight into the mixing apparatus or indirectly, via a weighing scale, into the mixer so as to provide a double check on the quantity required for addition.

What is claimed is:

1. Coloring compositions for concrete or mixes or the like comprising:
   (a) about 20-70% by weight of a solid particulate pigment,
   (b) about 0.4-15% by weight of a stabilizer,
   (c) about 0.1-3% by weight of a dispersant, and
   (d) about 12-77% by weight of an aqueous carrier which has been mixed and milled to form a thixotropic slurry.

2. The composition according to claim 1 wherein said stabilizer is at least one material of the group consisting of active clays, natural products of the alginate group, hydrolyzed starches, water soluble celluloses, natural starches, synthetic polymers of the polyvinyl type, or natural gums soluble in an aqueous carrier.

3. The composition according to claim 1 wherein said pigments consist of at least one of the group consisting of metallic oxides, metallic salts, or carbon black.

4. The composition according to claim 1 wherein said dispersant is at least one material of the solute group consisting of ethylene oxide condensates, fatty amines, alkylamines, or sulfonated soaps in the form of a metal derivative salt.

5. The composition according to claim 1 wherein said aqueous carrier is water.

6. The composition according to claim 1 wherein said pigment is present in the range of about 20-70% by weight.

7. The composition according to claim 1 wherein said stabilizer is present in the range of about 0.1-15% by weight.

8. The composition according to claim 7 wherein said stabilizer is a natural gum or resin soluble in an aqueous carrier.

9. The composition according to claim 7 wherein said stabilizer is a starch.

10. The composition according to claim 7 wherein said stabilizer is a water-soluble alginate.

11. The composition according to claim 7 wherein said stabilizer is a water soluble cellulose.

12. The composition according to claim 7 wherein said stabilizer is an active clay.

13. The composition according to claim 2 wherein said dispersant is present in the range of about 0.1-3% by weight.

14. The composition according to claim 13 wherein said dispersant is triethanolamine.

15. The composition according to claim 13 wherein said dispersant is sulfonated soap in the form of a metal derivative.

16. The composition according to claim 13 wherein said dispersant is sodium laurate.

17. The composition according to claim 13 wherein said dispersant is an ethylene oxide condensate.

18. The composition according to claim 13 wherein said dispersant is a fatty amine.

19. The method of making a coloring composition for concrete or cemetitious mixes or the like comprising the steps of:

(a) mixing a soluble dispersant and soluble stabilizer in an aqueous carrier until the dispersant and stabilizer are dissolved, said dispersant being about 0.1-3% by weight and said stabilizer being about 0.4-15% by weight of said composition said carrier constituting about 12-77% by weight of said composition, (b) mixing a solid particulate pigment into the solution until the mixture is uniform, said pigment constituting about 20-70% by weight of said composition, and (c) subjecting the uniform mixture to high-energy processing to reduce the pigment particles to a predetermined micron size range, whereupon a thixotropic slurry is formed characterized by prolonged resistance to settling-out.

20. The method according to claim 19 wherein said (a) step is performed by a low energy mixing apparatus.

21. The method according to claim 19 wherein said (b) step is performed by a low energy mixing apparatus.

22. The method according to claim 19 wherein said (c) step is performed until the sizes of said pigment are in the range of about 0.5-40 microns.

23. The method according to claim 19 wherein said (c) step is performed until the size of most of the smallest particles of said pigment are at least about 0.5 microns.

24. The method according to claim 19 wherein said (c) step is performed until the size of most of the largest particles of said pigment do not exceed 40 microns.

25. The method of making a coloring composition for concrete or cementitious mixes or the like comprising the steps of:

(a) mix a soluble dispersant and a nonsoluble stabilizer in an aqueous carrier until a homogenous suspension is formed, (b) mixing a solid particulate pigment into said suspension until a uniform suspension is obtained, and (c) subjecting the uniform suspension to high energy processing to reduce the pigment particles to a predetermined micron size range, whereupon a thixotropic slurry is formed characterized by prolonged resistance to settling-out.

26. The method according to claim 25 wherein said (c) step is performed until the sizes of said pigment are in the range of about 0.5-40 microns.

27. A colored concrete or cementitious mixture comprising, (a) a thixotropic coloring slurry comprising
 (1) about 20-70% by weight of a solid particulate pigment,
 (2) about 0.4-15% by weight of a stabilizer,
 (3) about 0.1-3% by weight of a dispersant, and
 (4) about 12-77% by weight of an aqueous carrier,
said slurry having been mixed and subjected to high-energy milling whereupon it is rendered thixatropic and (b) a wet cement or concrete mix with which said thixotropic slurry has been mixed.

28. The mixture according to claim 27 wherein said wet cement or concrete mix contains calcium ions.

29. A method for making a colored concrete or cementitious mixture comprising:

(a) mixing a soluble dispersant and soluble stabilizer in an aqueous carrier until the dispersant and stabilizer are dissolved, (b) mixing a solid particulate pigment into the solution until the mixture is uniform, (c) subjecting the uniform mixture to high-energy processing to reduce the pigment particles to a predetermined micron size range, whereupon a thixotropic slurry is formed, and (d) mixing said slurry with a wet cement or concrete mix.

* * * * *